(12) United States Patent
Fischer et al.

(10) Patent No.: US 7,004,019 B2
(45) Date of Patent: Feb. 28, 2006

(54) METHOD AND SYSTEM FOR THE DETECTION OF A PRESSURE DROP IN A TIRE

(75) Inventors: Martin Fischer, Regensburg (DE); Dominik Fuessel, Dietzenbach (DE); Franz Hillenmayer, Burglengenfeld (DE)

(73) Assignee: Siemens AG, München (DE)

( * ) Notice: Subject to any disclaimer, the term of this patent is extended or adjusted under 35 U.S.C. 154(b) by 167 days.

(21) Appl. No.: 10/236,969

(22) Filed: Sep. 9, 2002

(65) Prior Publication Data

US 2003/0074961 A1 Apr. 24, 2003

(51) Int. Cl.
*G01M 17/02* (2006.01)

(52) U.S. Cl. .......................... 73/146; 340/442; 340/445
(58) Field of Classification Search .................. 73/146, 73/146.2, 146.3, 146.4, 146.5, 146.8
See application file for complete search history.

(56) References Cited

U.S. PATENT DOCUMENTS

| 4,966,034 A |   | 10/1990 | Bock et al. |   |
|---|---|---|---|---|
| 5,886,624 A |   | 3/1999 | Hebert |   |
| 5,895,846 A | * | 4/1999 | Chamussy et al. | ......... 73/146.2 |
| 6,533,010 B1 | * | 3/2003 | Alonso et al. | .............. 152/419 |

FOREIGN PATENT DOCUMENTS

| DE | 68911024 T2 | 11/1989 |
| DE | 69202982 | 2/1993 |
| DE | 4303591 C2 | 8/1994 |
| EP | 0341226 | 11/1989 |
| EP | 0597940 B1 | 2/1993 |

OTHER PUBLICATIONS

Derwent Abstract PAT 1994–250094, Feb. 22, 1996.

* cited by examiner

*Primary Examiner*—Edward Lefkowitz
*Assistant Examiner*—Andre Allen
(74) *Attorney, Agent, or Firm*—Jacob Eisenberg; Siemens AG

(57) ABSTRACT

A system for the detection of a pressure drop in a tire comprising a tire air pressure sensor, a tire temperature sensor and an evaluating unit. The evaluating unit converts the measured air pressure values and temperature values into temperature compensated air pressure values and produces an alarm signal when the temporal fluctuation exceeds an air pressure fluctuation threshold value. The evaluating unit decreases the air pressure threshold value with increasing deviation from the measured temperature compensated air pressure value of a predetermined temperature compensated air pressure reference value. At least one further sensor may be provided for measuring a parameter which influences the air pressure in the tire whereby the evaluating unit corrects the measured and, regarding to the production of an alarm signal, evaluated air pressure according to this parameter.

41 Claims, 3 Drawing Sheets

METHOD AND SYSTEM FOR THE DETECTION OF A PRESSURE DROP IN A TIRE

CROSS REFERENCE TO RELATED APPLICATIONS

The present application claims the benefit of priority German Application number 101 44 361.7, filed Sep. 10, 2001, which is incorporated herein by reference.

BACKGROUND OF THE INVENTION

The present invention relates to the detection of pressure drop in a tire and more particularly to a method and a system for the detection of a pressure drop in a tire and for generating an alarm after a certain drop in pressure has occurred. The invention is suitable for the detection of a pressure drop in all types of pneumatic tires. It is especially suitable for vehicle tires, like passenger car tires, truck tires, motorcycle tires, etc.

A vehicle tire monitoring system is set out in U.S. Pat. No. 5,895,846, wherein the system: periodically measures the air pressure and temperature in the tire; corrects the measured temperature; and creates an alarm signal if the temperature corrected air pressure changes over time by more than a threshold amount.

SUMMARY OF THE INVENTION

The invention is based upon a task of finding a method to more precisely note an undesired pressure drop in a tire that might result in the tire becoming unroadworthy. A first solution to this objective is obtained as follows. The air pressure fluctuation threshold value depends on the momentary measured air pressure and it is possible to reduce the air pressure fluctuation threshold value preferably with decreasing measured temperature compensated air pressure so that the instant method works more sensitively. Another solution to the invention's task is obtained whereby the measured air pressure is not compensated only with regard to the measured temperature, but also with regard to at least one additional parameter influencing the air pressure in the tire, for example the external air pressure or the velocity of a vehicle. Yet another solution of the invention's task is obtained from implementation which is particularly safe and free of external influences because air pressure fluctuations are detected and evaluated over a lengthy period of time.

Other solutions are provided by the present invention which comprises a method for detecting an air pressure drop in a tire, comprising the steps of: measuring air pressure within said tire; measuring air temperature within said tire; converting measured air pressure into a temperature compensated second air pressure, said converting being in accordance with said measured temperature; determining temporal fluctuations of said temperature compensated second air pressure, said fluctuations being in accordance with a difference between said temperature compensated second air pressure and a predetermined temperature compensated reference air pressure; and generating an alarm if said fluctuations exceed a predetermined threshold.

Still other solutions are provided by the present invention which comprises a method for detecting a pressure drop in a tire, comprising the steps of: measuring air pressure within said tire; measuring air temperature within said tire; converting said air pressure into a temperature compensated air pressure corresponding to said temperature; determining temporal fluctuation of said temperature compensated air pressure; generating an alarm signal when said temporal fluctuation of said temperature compensated air pressure exceeds an air pressure threshold value, wherein at least one additional parameter which influences air pressure in said tire is measured; and updating determined temporal fluctuation of said temperature compensated air pressure according to said measured additional parameter.

Still other solutions are provided by the present invention which comprises a method for detecting air pressure drop in a tire, comprising the steps of: measuring air pressure with said tire; measuring air temperature within said tire; converting said air pressure into a temperature compensated air pressure corresponding to said temperature; determining temporal fluctuation of said temperature compensated air pressure; generating an alarm signal when said air pressure fluctuates in a predetermined way wherein: deviations of at least two consecutively measured temperature compensated air pressure values are stored together with respective times when respective deviations exceed a predetermined first threshold value; a sum of the stored deviations within a predetermined time interval is calculated; and said alarm signal is generated when said sum exceeds a predetermined second threshold value.

Still other solutions are provided by the present invention which comprises a system for detecting air pressure drop in a tire, comprising: an air pressure sensor for detecting air pressure in said tire; a temperature sensor for detecting air temperature in said tire; an alarm generator for generating a human detectable alarm; and an evaluating unit connected to said air pressure sensor, temperature sensor, and alarm generator; said unit comprising: means for evaluating signals from said air pressure and temperature sensors, means for converting measured air pressure values and temperature values into temperature compensated air pressure values, means for determining temporal fluctuations of said compensated air pressure values, means for causing an alarm to generate at said alarm generator when said temporal fluctuation exceeds an air pressure fluctuation threshold value, and means for decreasing said air pressure fluctuation threshold value with increasing deviation of said measured temperature compensated air pressure value by a predetermined temperature compensated air pressure reference value.

Still other solutions are provided by the present invention which comprises a system for detecting air pressure drop in a tire, comprising: an air pressure sensor for detecting air pressure in said tire; a temperature sensor for detecting air temperature in said tire; at least one additional sensor for measuring a parameter which influences air pressure in said tire; an alarm generator for generating a human detectable alarm; and an evaluating unit in electrical communication with said air pressure sensor, temperature sensor, at least one additional sensor, and alarm generator, said unit comprising means for: converting measured air pressure values and temperature values into temperature compensated air pressure values, determining temporal fluctuation of said compensated air pressure values, causing alarm signals to be generated in said alarm generator when said temporal fluctuation exceeds a threshold value, and correcting said temporal fluctuation in accordance with said parameter.

Still other solutions are provided by the present invention which comprises a system for the detection of a pressure drop in a tire, comprising: an air pressure sensor for detecting air pressure in said tire; a temperature sensor for detecting temperature in said tire; an alarm generator for generating a human detectable alarm; and an evaluating unit in electrical communication with said air pressure sensor, said temperature sensor, and alerting unit, said unit comprising means for: converting measured air pressure values and temperature values into temperature compensated air pressure values and producing an alarm signal when said temperature compensated air pressure fluctuates in a predetermined way; storing deviations of two temperature compensated air pressure values measured in predetermined time intervals together with associated times thereof; and when a deviation exceeds a predetermined first threshold value, further calculating a sum of stored deviations of a time interval whose length is predetermined and producing an alarm signal at said alarm generator when said sum exceeds a predetermined second threshold value.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

DETAILED DESCRIPTION OF THE INVENTION

Figure 1:
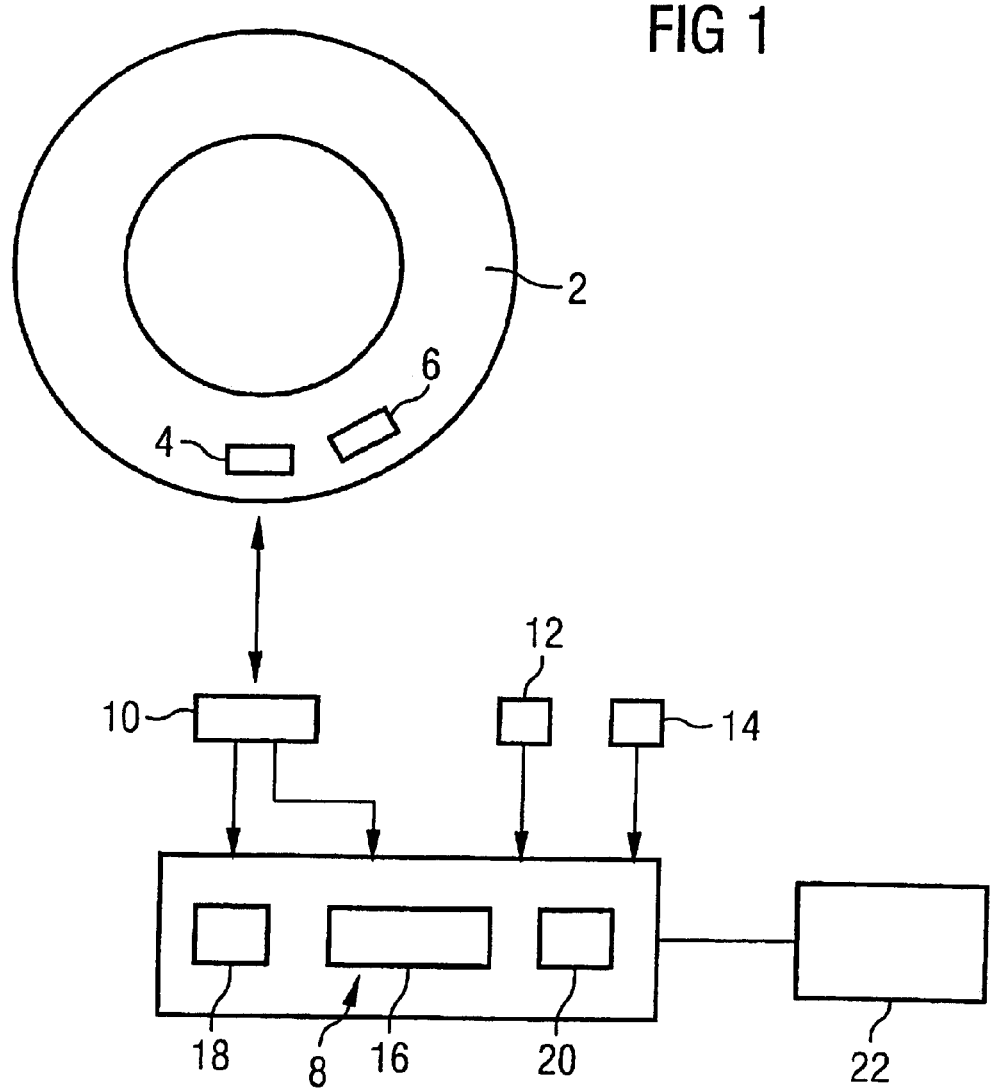
FIG. 1 depicts a schematic of a system according to an embodiment of the present invention

As shown in FIG. 1, a pressure sensor 4 for the detection of air pressure inside a tire, and a temperature sensor 6 for the detection of temperature inside the tire, are placed in vehicle tire 2. Structure and function of such sensors are known to one skilled in the art. Pressure sensor 4 does not necessarily have to be placed immediately within the interior space of the tire. Rather, it can also be placed at a valve, such that the pressure sensitive element of pressure sensor 4 detects the internal pressure of the tire. The temperature detected by temperature sensor 6 should be little influenced by the wall of the tire, so that the temperature sensor can be placed, thermally insulated, at the rim. If the pressure sensor 4 is placed at the valve and the temperature sensor 6 is not placed at the internal wall of the tire, but at the rim, the tire itself is not affected by the sensors. It is also possible to install both sensors at the valve or at the rim.

The output signals of sensors 4 and 6 are transmitted to an evaluating unit 8. Depending upon the structure and arrangement of the sensors, this may occur as follows: mechanically by sliding contact; wirelessly in generally known ways such as inductively, capacitively, unidirectionally by radio, or bidirectionally by transponders which communicate with a sending/receiving unit 10 which further edits the signals sent from the assigned transponders by the sensors and supplies input to evaluating unit 8. An ambient air pressure sensor 12 and a velocity sensor 14 are connected to the inputs of the evaluating unit 8 as well.

The evaluating unit 8 comprises a generally known microprocessor 16 with a program memory 18 and a data memory 20. An output of evaluating unit 8 is directed to monitoring, alarm, or alerting unit 22 which may comprise a warning light or a display in a vehicle dashboard along with acoustic output if desired. A first method embodiment of the present invention is set out with reference to the flow chart of FIG. 2.

The method starts in step 30 and proceeds to step 32 wherein pressure and temperature values of a predetermined cycle of sensors are stored into memory of evaluating unit 8. The stored values are edited in step 34, for example filtered, to eliminate transient fluctuations or external interferences. In step 36, the processed and read pressure values will be compensated with the processed and read temperature values according to the example formula $p_c = p_m \times T_c / T_m$, wherein $p_c$ is the temperature compensated and measured pressure value, $p_m$ is the measured pressure value, Tc is a reference temperature, and Tm is the measured temperature. The temperatures are in absolute temperature values. The temporal fluctuation of the pressure values generated and compensated in step 36 are then calculated in step 38 wherein various methods may be used, including: a successive communication over n values; or only the fluctuation of each of two values measured in constant consecutive intervals. It is determined in step 40 if the temporal fluctuation of the measured compensated pressure values determined in step 38 lies above an air pressure fluctuation threshold value of $p_s$. If this is not the case, the method returns to step 32. If this is the case, an alarm signal is produced in step 42.

According to another embodiment of the present inventive method, the air pressure changed threshold $p_s$ is not a constant predetermined value, but dependent upon the difference between a prestored temperature compensated pressure value—which is for instance the optimal temperature compensated tire air pressure—and the currently measured compensated pressure value $p_s$ which is continuously calculated in the evaluating unit and becomes smaller with increasing deviation so that the system increasingly reacts more sensitively in increasingly dangerous situations during which the air pressure increasingly drops.

The air pressure fluctuation threshold value $p_s$ is a constant, predetermined, stored value, in another embodiment of the invention, and the pressure values are not only compensated dependant upon the measured temperature in step 36, but dependant on further parameters influencing the internal pressure of the tires, like the measured ambient air pressure by the sensor 12 and/or the measured vehicle velocity by velocity sensor 14. The compensation then occurs according to the general formula:

$p_c = p_m \times f(T, x_i)$, wherein $f(T, x_i)$ is a function which indicates an independent value of the conversion of the measured pressure value, parameter T influences the temperature, and parameters $x_i$ influence the pressure. The compensation can alternatively or additionally occur for the threshold value fluctuation.

The inventive systems and methods can be modified in various respects. For example, the time of the temporal pressure fluctuation, determined in step 40, can be extrapolated for when a predetermined low and dangerous air pressure will occur, so that the driver of a vehicle can assess how long he can still drive on a tire with an effected pressure drop. Further, the above mentioned reference air pressure, which corresponds to an optimal tire air pressure, can not only be compensated corresponding to temperature, but also other factors which influence the optimal air pressure, like the vehicle's load, the vehicle's velocity, etc. Likewise, a stored and improperly low air pressure level, the undermining of which will generate a warning signal and exceeding of which will be calculated where appropriate, can depend upon such parameters.

Figure 2:
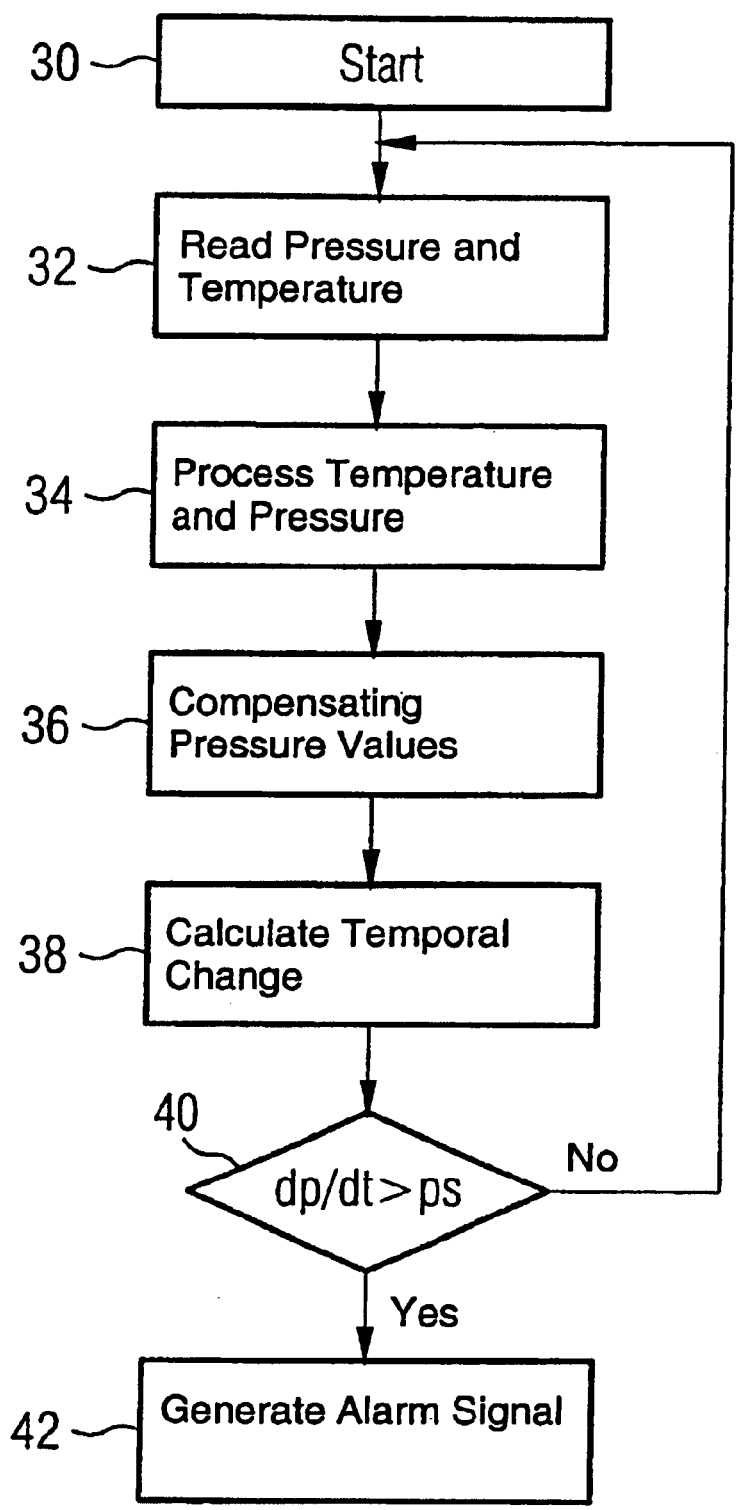
FIG. 2 depicts a flowchart according to an embodiment of the present invention.
Figure 3:
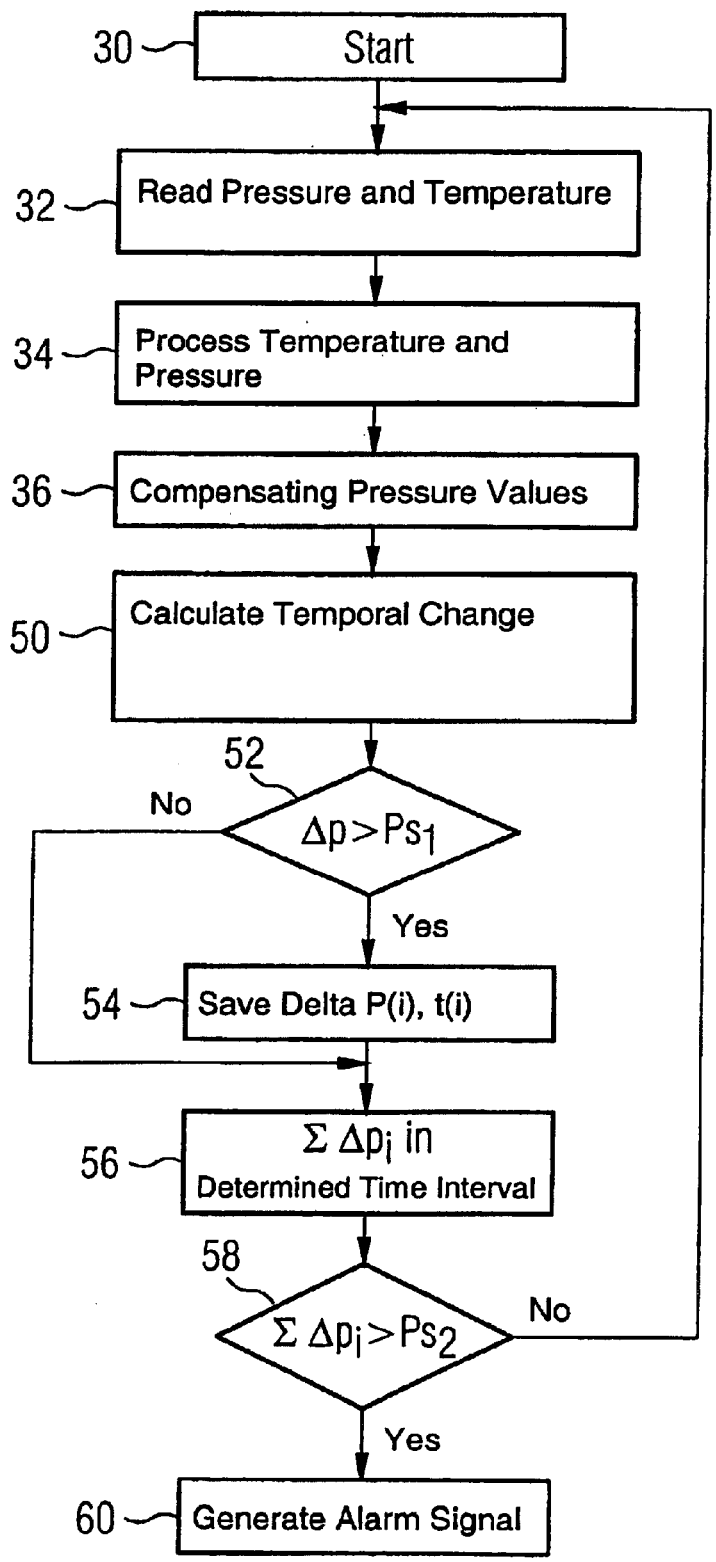
FIG. 3 depicts a flowchart according to a second embodiment of the present invention.

FIG. 3 depicts a flowchart, based upon FIG. 2, comprising another embodiment of the present invention. The steps 30 to 36 coincide with the same numbered steps in FIG. 2. In step 50, the difference between the current and a previously determined measured or compensated pressure value $\Delta_p$ is calculated. If this is the case, the deviation $\Delta_p$ is then stored in step 54 together with the time of its determination. The sum of the deviations $\Delta_{pi}$ which have occurred within a predetermined time interval, is determined in step 56. If it has been determined, in step 52, that $\Delta_p$ is less than or equal to the predetermined first threshold value $p_{s1}$, then the system jumps immediately to step 56. It is determined in step 58 if the generated sum in step 56 is greater than the second threshold value $p_{S2}$. If this is not the case, the system then jumps back to step 32. If this is the case, an alarm signal is then generated in step 60.

An advantage which is achieved with the method according to FIG. 3 lies therein that within each determined sum generation in step 56 and a time interval which is predetermined in its length, only those pressure deviations are detected which are above the threshold according to step 52. Subtle pressure deviations which are for example only conditioned by fluctuations of the ambient pressure or other such parameters are suppressed from the start. It is understood that the threshold values of the steps 52 and 58, as well as the time interval of step 56, can be adjusted to certain conditions, such as to the determined compensated pressure value, ambient temperature, vehicle velocity, vehicle load, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for detecting an air pressure drop in a tire, comprising the steps of:
   measuring air pressure within said tire;
   measuring air temperature within said tire;
   converting measured air pressure into a temperature compensated second air pressure, said converting being in accordance with said measured temperature;
   determining temporal fluctuations of said temperature compensated second air pressure, said fluctuations being in accordance with a difference between said temperature compensated second air pressure and a predetermined temperature compensated reference air pressure; and
   generating an alarm if said fluctuations exceed a predetermined threshold.

2. The method according to claim 1, wherein said step of converting is further in accordance with measured air pressure, and a reference temperature.

3. The method according to claim 1, wherein said predetermined threshold is a substantially optimal tire pressure.

4. The method according to claim 3, wherein said reference air pressure depends upon parameters which influence optimal air pressure.

5. The method according to claim 4, wherein said parameters include ambient air pressure.

6. The method according to claim 4, wherein said parameters include vehicle velocity.

7. The method according to claim 4, wherein said parameters include vehicle load.

8. The method according to claim 1, further comprising the steps of:
   extrapolating various degrees of operating safety levels of said tire;
   determining if said measured air pressure falls below any one of said safety levels; and
   generating an alarm if said air pressure falls below any one of said safety levels.

9. The method according to claim 8, further comprising the steps of:
   determining rate in which said air pressure falls below a highest of said safety levels;
   extrapolating from said rate a time when said air pressure falls below a lowest of said safety levels; and
   displaying said time when said alarm is generated.

10. The method according to one or several of the claim 1, further comprising the step of:
    determining time when said measured pressure drops below a predetermined air pressure limit; and
    displaying said time.

11. A method for detecting a pressure drop in a tire, comprising the steps of:
    measuring air pressure within said tire;
    measuring air temperature within said tire;
    converting said air pressure into a temperature compensated air pressure corresponding to said temperature;
    determining temporal fluctuation of said temperature compensated air pressure;
    generating an alarm signal when said temporal fluctuation of said temperature compensated air pressure exceeds an air pressure threshold value, wherein at least one additional parameter which influences air pressure in said tire is measured; and
    updating determined temporal fluctuation of said temperature compensated air pressure according to said measured additional parameter.

12. The method according to claim 11, wherein said step of converting is further in accordance with measured air pressure, and a reference temperature.

13. The method according to claim 11, wherein said parameter includes ambient air pressure.

14. The method according to claim 11, wherein said parameter includes vehicle velocity.

15. The method according to claim 11, wherein said parameter includes vehicle load.

16. The method according to claim 11, further comprising the steps of:
    extrapolating various degrees of operating safety levels of said tire;
    determining if said measured air pressure falls below any one of said safety levels; and
    generating an alarm if said air pressure falls below any one of said safety levels.

17. The method according to claim 16, further comprising the steps of:
    determining rate in which said air pressure falls below a highest of said safety levels;
    extrapolating from said rate a time when said air pressure falls below a lowest of said safety levels; and
    displaying said time when said alarm is generated.

18. The method according to one or several of the claim 11, further comprising the step of:
    determining time when said measured pressure drops below a predetermined air pressure limit; and
    displaying said time.

19. A method for detecting air pressure drop in a tire, comprising the steps of:
    measuring air pressure with said tire;
    measuring air temperature within said tire;

converting said air pressure into a temperature compensated air pressure corresponding to said temperature;

determining temporal fluctuation of said temperature compensated air pressure;

generating an alarm signal when said air pressure fluctuates in a predetermined way wherein deviations of at least two consecutively measured temperature compensated air pressure values are stored together with respective times when respective deviations exceed a predetermined first threshold value, a sum of the stored deviations within a predetermined time interval is calculated, and said alarm signal is generated when said sum exceeds a predetermined second threshold value.

20. The method according to claim 19, wherein said step of converting is further in accordance with measured air pressure, and a reference temperature.

21. The method according to claim 19, further comprising the steps of:

extrapolating various degrees of operating safety levels of said tire;

determining if said measured air pressure falls below any one of said safety levels; and generating an alarm if said air pressure falls below any one of said safety levels.

22. The method according to claim 19, further comprising the steps of:

determining rate in which said air pressure falls below a highest of said safety levels;

extrapolating from said rate a time when said air pressure falls below a lowest of said safety levels; and displaying said time when said alarm is generated.

23. The method according to one or several of the claim 19, further comprising the step of:

determining time when said measured pressure drops below a predetermined air pressure limit; and displaying said time.

24. A system for detecting air pressure drop in a tire, comprising:

an air pressure sensor for detecting air pressure in said tire;

a temperature sensor for detecting air temperature in said tire;

an alarm generator for generating a human detectable alarm; and an evaluating unit connected to said air pressure sensor, temperature sensor, and alarm generator; said unit comprising:

means for evaluating signals from said air pressure and temperature sensors, means for converting measured air pressure values and temperature values into temperature compensated air pressure values, means for determining temporal fluctuations of said compensated air pressure values, means for causing an alarm to generate at said alarm generator when said temporal fluctuation exceeds an air pressure fluctuation threshold value, and means for decreasing said air pressure fluctuation threshold value with increasing deviation of said measured temperature compensated air pressure value by a predetermined temperature compensated air pressure reference value.

25. The system according to claim 24, wherein said step of converting is further in accordance with measured air pressure, and a reference temperature.

26. The system according to claim 24, wherein said evaluating unit further comprises means for:

determining time of measured air pressure drops below a predetermined air pressure; and displaying said time via said alarm generator.

27. The system according to claim 24, wherein said evaluating unit further comprises means for:

extrapolating various degrees of operating safety levels of said tire;

determining if said measured air pressure falls below any one of said safety levels; and generating an alarm if said air pressure falls below any one of said safety levels.

28. The system according to claim 27, wherein said evaluation unit further comprises further means for:

determining rate in which said air pressure falls below a highest of said safety levels;

extrapolating from said rate a time when said air pressure falls below a lowest of said safety levels; and displaying said time when said alarm is generated.

29. A system for detecting air pressure drop in a tire, comprising:

an air pressure sensor for detecting air pressure in said tire;

a temperature sensor for detecting air temperature in said tire;

at least one additional sensor for measuring a parameter which influences air pressure in said tire;

an alarm generator for generating a human detectable alarm; and an evaluating unit in electrical communication with said air pressure sensor, temperature sensor, at least one additional sensor, and alarm generator, said unit comprising means for:

converting measured air pressure values and temperature values into temperature compensated air pressure values, determining temporal fluctuation of said compensated air pressure values, causing alarm signals to be generated in said alarm generator when said temporal fluctuation exceeds a threshold value, and correcting said temporal fluctuation in accordance with said parameter.

30. The system according to claim 29, wherein said step of converting is further in accordance with measured air pressure, and a reference temperature.

31. The system according to claim 29, wherein said parameter includes ambient air pressure.

32. The system according to claim 29, wherein said parameter includes vehicle velocity.

33. The system according to claim 29, wherein said parameter includes vehicle load.

34. The system according to claim 29, wherein said evaluating unit further comprises means for:

determining time of measured air pressure drops below a predetermined air pressure; and means for having said time displayed.

35. The system according to claim 29, wherein said evaluation unit further comprises means for:

extrapolating various degrees of operating safety levels of said tire;

determining if said measured air pressure falls below any one of said safety levels; and generating an alarm if said air pressure falls below any one of said safety levels.

36. The system according to claim 35, wherein said evaluation unit further comprises further means for:
  determining rate in which said air pressure falls below a highest of said safety levels;
  extrapolating from said rate a time when said air pressure falls below a lowest of said safety levels; and
  displaying said time when said alarm is generated.

37. A system for the detection of a pressure drop in a tire, comprising:
  an air pressure sensor for detecting air pressure in said tire;
  a temperature sensor for detecting temperature in said tire;
  an alarm generator for generating a human detectable alarm; and
  an evaluating unit in electrical communication with said air pressure sensor, said temperature sensor, and alerting unit, said unit comprising means for:
    converting measured air pressure values and temperature values into temperature compensated air pressure values and producing an alarm signal when said temperature compensated air pressure fluctuates in a predetermined way;
    storing deviations of two temperature compensated air pressure values measured in predetermined time intervals together with associated times thereof; and
    when a deviation exceeds a predetermined first threshold value, further calculating a sum of stored deviations of a time interval whose length is predetermined and producing an alarm signal at said alarm generator when said sum exceeds a predetermined second threshold value.

38. The system according to claim 37, wherein said step of converting is further in accordance with measured air pressure, and a reference temperature.

39. The system according to claim 37, further wherein said evaluating unit further comprises means for determining time of measured air pressure drops below an predetermined air pressure and means for having said time displayed by said alarm generator.

40. The system according to claim 37, wherein said evaluation unit further comprises means for:
  extrapolating various degrees of operating safety levels of said tire;
  assigning weight to said various degrees;
  determining if said measured air pressure falls below any one of said safety levels; and
  generating an alarm if said air pressure falls below any one of said safety levels.

41. The system according to claim 40, wherein said evaluation unit further comprises further means for:
  determining rate in which said air pressure falls below a highest of said safety levels;
  extrapolating from said rate a time when said air pressure falls below a lowest of said safety levels; and
  displaying said time when said alarm is generated.

* * * * *

(12) EX PARTE REEXAMINATION CERTIFICATE (10596th)
United States Patent
Fischer et al.

(10) Number: US 7,004,019 C1
(45) Certificate Issued: May 12, 2015

(54) METHOD AND SYSTEM FOR THE DETECTION OF A PRESSURE DROP IN A TIRE

(75) Inventors: Martin Fischer, Regensburg (DE); Dominik Fuessel, Dietzenbach (DE); Franz Hillenmayer, Burglengenfeld (DE)

(73) Assignee: CONTINENTAL AUTOMOTIVE GMBH, Hannover (DE)

Reexamination Request:
No. 90/013,268, Jun. 23, 2014

Reexamination Certificate for:
Patent No.: 7,004,019
Issued: Feb. 28, 2006
Appl. No.: 10/236,969
Filed: Sep. 9, 2002

(51) Int. Cl.
*G01M 17/02* (2006.01)
*B60C 23/04* (2006.01)

(52) U.S. Cl.
CPC ................... *B60C 23/0408* (2013.01)

(58) Field of Classification Search
CPC ................................ B60C 23/0408

USPC ..................... 73/146; 340/442, 445
See application file for complete search history.

(56) References Cited

To view the complete listing of prior art documents cited during the proceeding for Reexamination Control Number 90/013,268, please refer to the USPTO's public Patent Application Information Retrieval (PAIR) system under the Display References tab.

*Primary Examiner* — Linh M Nguyen

(57) ABSTRACT

A system for the detection of a pressure drop in a tire comprising a tire air pressure sensor, a tire temperature sensor and an evaluating unit. The evaluating unit converts the measured air pressure values and temperature values into temperature compensated air pressure values and produces an alarm signal when the temporal fluctuation exceeds an air pressure fluctuation threshold value. The evaluating unit decreases the air pressure threshold value with increasing deviation from the measured temperature compensated air pressure value of a predetermined temperature compensated air pressure reference value. At least one further sensor may be provided for measuring a parameter which influences the air pressure in the tire whereby the evaluating unit corrects the measured and, regarding to the production of an alarm signal, evaluated air pressure according to this parameter.

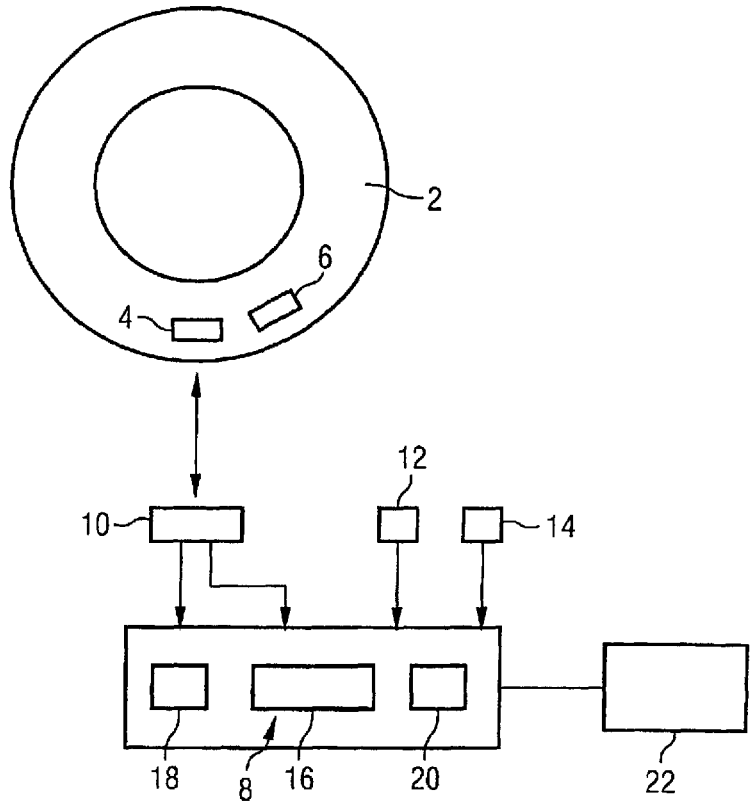

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

New claims 42-51 are added and determined to be patentable.

Claims 2-41 were not reexamined.

*42. A method for detecting an air pressure drop in a tire, comprising the steps of:*
  *measuring air pressure within said tire;*
  *measuring air temperature within said tire;*
  *converting measured air pressure into a temperature compensated second air pressure, said converting being in accordance with said measured temperature;*
  *determining temporal fluctuations of said temperature compensated second air pressure, said fluctuations being in accordance with a difference between said temperature compensated second air pressure and a predetermined temperature compensated reference air pressure; and*
  *generating an alarm to a receiving device if said fluctuations exceed a predetermined threshold.*

*43. The method according to claim 42, wherein said step of converting is further in accordance with measured air pressure, and a reference temperature.*

*44. The method according to claim 42, wherein said predetermined threshold is a substantially optimal tire pressure.*

*45. The method according to claim 44, wherein said reference air pressure depends upon parameters which influence optimal air pressure.*

*46. The method according to claim 45, wherein said parameters include ambient air pressure.*

*47. The method according to claim 45, wherein said parameters include vehicle velocity.*

*48. The method according to claim 45, wherein said parameters include vehicle load.*

*49. The method according to claim 42, further comprising the steps of:*
  *extrapolating various degrees of operating safety levels of said tire; determining if said measured air pressure falls below any one of said safety levels; and generating an alarm to a receiving device if said air pressure falls below any one of said safety levels.*

*50. The method according to claim 49, further comprising the steps of: determining rate in which said air pressure falls below a highest of said safety levels; extrapolating from said rate a time when said air pressure falls below a lowest of said safety levels; and displaying said time when said alarm is generated.*

*51. The method according to claim 42, further comprising the step of: determining time when said measured pressure drops below a predetermined air pressure limit; and displaying said time.*

\* \* \* \* \*